(12) United States Patent
Moore

(10) Patent No.: US 6,376,951 B1
(45) Date of Patent: Apr. 23, 2002

(54) COVER FOR MARINE GENERATORS

(75) Inventor: Marshall R. Moore, Tampa, FL (US)

(73) Assignee: Tampa Armature Works, Inc., Tampa, FL (US)

( * ) Notice: Subject to any disclaimer, the term of this patent is extended or adjusted under 35 U.S.C. 154(b) by 0 days.

(21) Appl. No.: 09/681,633

(22) Filed: May 14, 2001

(51) Int. Cl.[7] .............................. H02K 5/24; H02K 5/10
(52) U.S. Cl. ...................... 310/89; 181/202; 248/672; 290/1 R
(58) Field of Search ................................ 248/638, 672; 290/1 R, 1 A, 1 B; 310/89; 181/200, 202; 322/1

(56) References Cited

U.S. PATENT DOCUMENTS

| | | | |
|---|---|---|---|
| 4,048,366 A | 9/1977 | Kingsbury | 428/215 |
| 4,137,888 A | 2/1979 | Allan | 123/198 |
| 4,226,214 A | 10/1980 | Palazzetti | 181/204 |
| 4,493,390 A | 1/1985 | Pagano et al. | 181/204 |
| 4,495,901 A | 1/1985 | Nannini et al. | 123/2 |
| 4,522,165 A | 6/1985 | Ogawa | 123/2 |
| 4,548,164 A | 10/1985 | Ylonen et al. | 123/2 |
| 4,657,290 A | 4/1987 | Linden | 290/2 |
| 4,788,950 A | 12/1988 | Finley | 123/195 C |
| 5,121,715 A | 6/1992 | Nogami et al. | 123/41.7 |
| 5,266,856 A * | 11/1993 | Holter | 310/51 |
| 5,467,747 A | 11/1995 | Brandt et al. | 123/198 E |
| 5,734,148 A * | 3/1998 | Latvis et al. | 290/1 A |
| 5,857,439 A | 1/1999 | Will et al. | 123/184.21 |
| 5,899,174 A | 5/1999 | Anderson et al. | 123/2 |
| 5,924,393 A | 7/1999 | Kikuchi | 123/2 |
| 6,067,945 A | 5/2000 | Fukuda et al. | 123/2 |
| 6,089,932 A | 7/2000 | Nanami et al. | 181/204 |

* cited by examiner

*Primary Examiner*—Burton S. Mullins
(74) *Attorney, Agent, or Firm*—Ronald E. Smith; Smith & Hopen, P.A.

(57) ABSTRACT

13A cover for a marine generator that attenuates the noise produced by the generator when operating and shields the generator from overhead water damage. The cover includes a substantially water resistant flat top wall having a layer of sound-absorbing material secured to its underside. The flat top wall is supported by four leg members and is disposed in closely spaced apart relation to the top of the generator. Some parts of the generator can be serviced when the flat top wall is locked into place and all parts of the generator can be serviced when the flat top wall is removed.

20 Claims, 2 Drawing Sheets

COVER FOR MARINE GENERATORS

BACKGROUND OF THE INVENTION

1. Field of the Invention

This invention relates, generally, to the boating industry. More particularly, it relates to devices that protects marine generators from water damage and reduce noise levels on marine craft.

2. Description of the Prior Art

Marine generators are typically installed in the hull of a boat. Although many hulls are substantially watertight, water often leaks through decks, falling on the marine generator and causing damage to the equipment.

Furthermore, marine generators produce unacceptably high noise levels. Noise-reducing materials may be wrapped around a generator, but such materials may cause unwanted heat build-up. They also get in the way when generator adjustment or maintenance is required.

What is needed, then, is a device for shielding a below-deck marine generator from overhead water damage.

There is an additional need for a device that lowers generator noise yet which allows the generator to be fully ventilated at all times and which provides easy access to the generator for service purposes.

However, in view of the prior art in at the time the present invention was made, it was not obvious to those of ordinary skill in the pertinent art how the identified needs could be fulfilled.

SUMMARY OF THE INVENTION

The longstanding but heretofore unfulfilled need for a marine generator noise suppresser and water shield is now met by a new, useful, and nonobvious invention that includes a sound-attenuating and water resistant cover. The structure includes a flat top wall adapted to overlie a marine generator in closely spaced apart relation thereto and a layer of sound-absorbing material that is secured to the flat top wall in underlying relation thereto. The flat top wall has a front edge, a rear edge, and opposed side edges. A front wall depends from the front edge, a rear wall depends from the rear edge, and a side wall depends from each of the side edges. A plurality of upstanding leg members of equal length supports the flat top wall in a substantially horizontal plane. The leg members include a pair of rear leg members and a pair of front leg members.

A first releasable engagement means releasably engages the pair of rear leg members to the rear wall and a second releasable engagement means releasably engages the pair of front leg members to the front wall. The second releasable engagement means includes a lock means that locks the front wall to the pair of front leg members.

The rear wall and the rear leg members are maintained in secure engagement to one another when the second releasable engagement means is in a locked configuration. The rear leg members are separable from the rear wall when the second releasable engagement means is in its locked configuration. In this way, when the second releasable engagement means is in its locked configuration, the flat top wall is maintained in engaged relation to said upstanding leg members. When the second releasable engagement means is in its unlocked configuration. the rear leg members are releasable from the rear wall so that the flat top wall is disengageable from the upstanding leg members to facilitate access to the marine generator for service and repair purposes.

A pair of alignment apertures are formed in the rear wall in spaced apart relation to one another and an alignment pin formed on each of the rear leg members. Each alignment aperture of the pair of alignment apertures is adapted to slidingly receive an associated alignment pin when the rear leg members are releasably engaged to the rear wall.

The pair of rear leg members and the pair of front leg members includes a first pair of leg members formed by a first front leg member and a first rear leg member that are integrally formed with one another. A second pair of leg members is formed by a second front leg member and a second rear leg member that are integrally formed with one another.

A pair of catch members is secured to the front wall in spaced apart relation to one another. A corresponding pair of latch members includes a first latch member secured to the first front leg member and a second latch member secured to the second front leg member. The first latch member includes a first actuator handle and the second latch member includes a second actuator handle. The first actuator handle has a first position that causes the first latch member to engage the first catch member and a second position that causes the first latch member to release the first catch member. The second actuator handle has a first position that causes the second latch member to engage the second catch member and a second position that causes the second latch member to release the second catch member. Accordingly, the flat top wall is disengageable from the upstanding leg members when the first and second actuator handles are in their respective second positions. The flat top wall is connected at four points to the upstanding leg members and is releasable from all four of those points by positioning the first and second actuator members in said respective second positions.

A first interconnecting member interconnects respective uppermost ends of the first front leg member and the first rear leg member and a second interconnecting member interconnects respective uppermost ends of the second front leg member and the second rear leg member.

A first brace member interconnects the first front leg member and the second front leg member. A second brace member interconnects the first rear leg member and the second rear leg member.

The front wall and said rear wall of said cover have a common trapezoidal configuration and the opposing side walls have a common rectangular configuration. The opposing side walls are sloped downwardly relative to a horizontal plane at an angle of about forty five degrees.

A primary object of the invention is to shield a marine generator from overhead water damage.

Another primary object of the invention is to provide an apparatus for attenuating the noise produced by a marine generator.

A closely related object is to attain the foregoing object with a device that provides full ventilation of the generator at all times.

Another closely related object is to provide such a device in a form that does not interfere with routine service of the generator.

A more specific object is to provide an apparatus that may be quickly locked into position and just as quickly unlocked so that it can be easily removed when needed.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION

Figure 1:
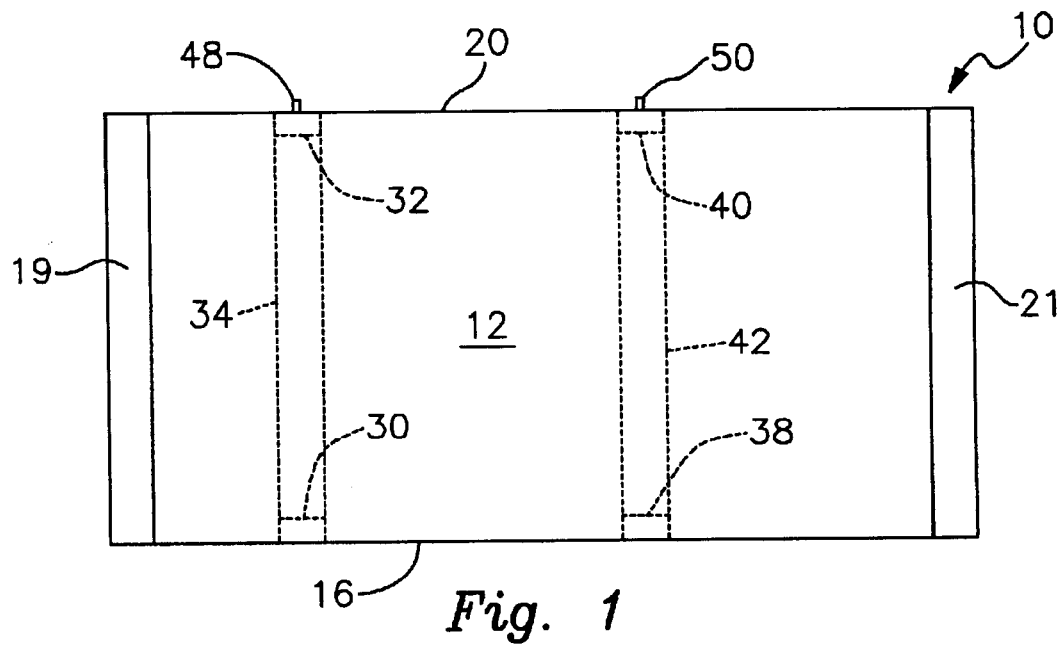
FIG. 1 is a top plan view of the novel noise-attenuator.
Figure 2:
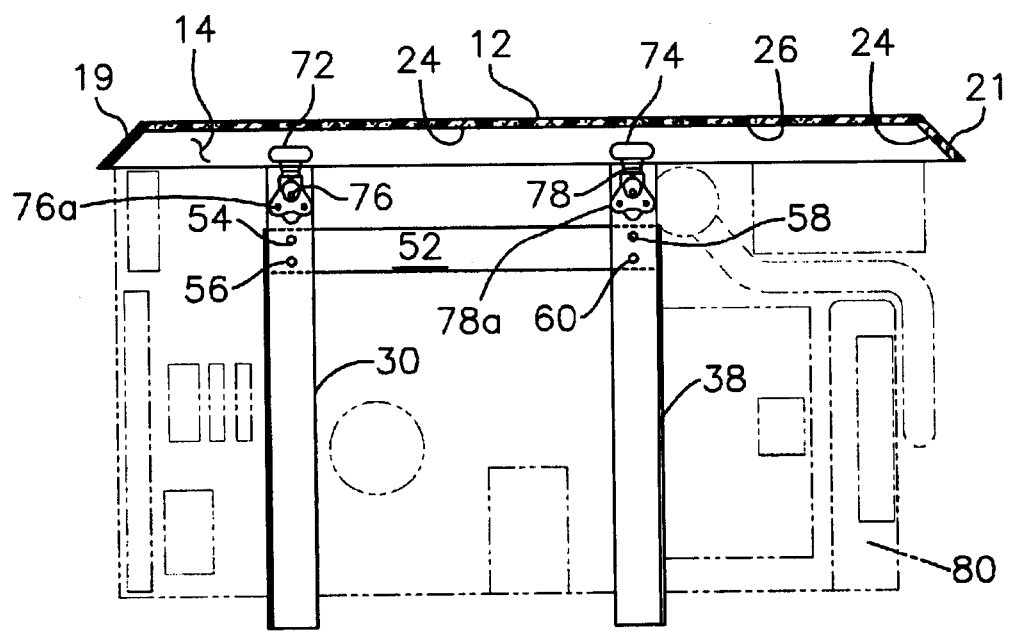
FIG. 2 is a front elevational view thereof.
Figure 3:
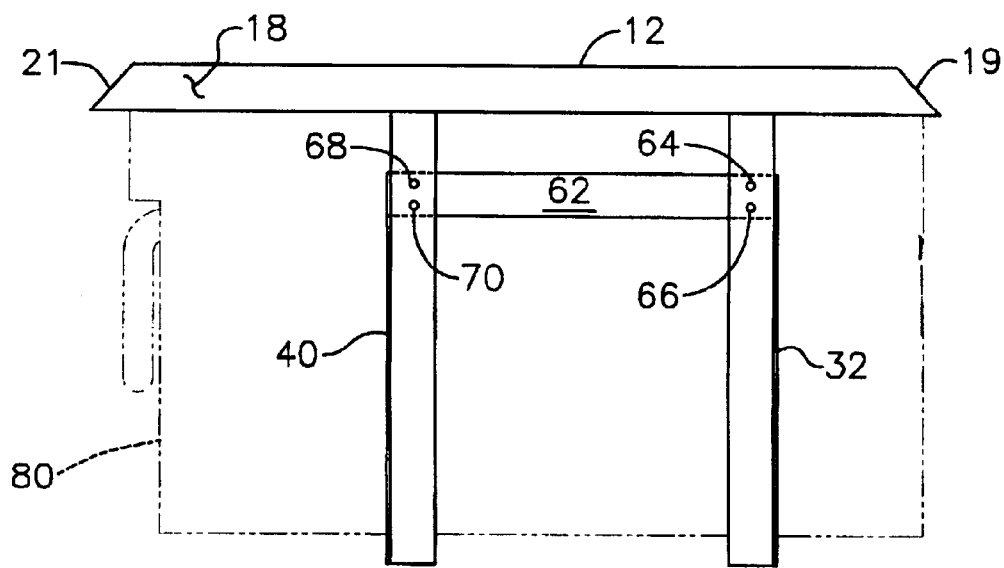
FIG. 3 is a rear elevational view thereof.
Figure 4:
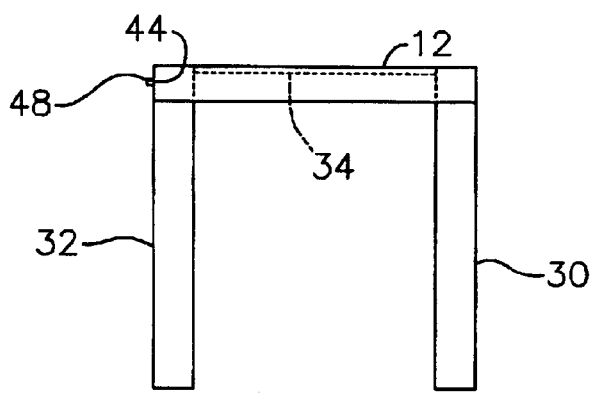
FIG. 4 is a first end elevational view thereof.
Figure 5:
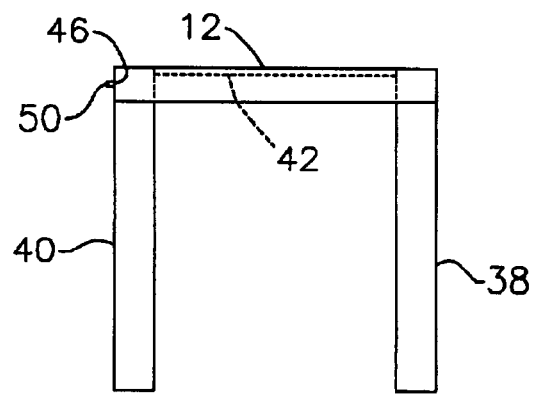
FIG. 5 is a second end elevational view thereof.

Referring to FIGS. 1–5, it will there be seen that the reference numeral 10 denotes an illustrative embodiment of the present invention.

Marine generator cover 10, to be known commercially as the Shussh Kover™, includes a flat top wall 12 of generally rectangular construction and is formed a of substantially water resistant material such as stainless steel, which also resists corrosion. Front wall 14 (FIG. 2) of trapezoidal configuration depends from a forward edge 16 of flat top wall 12. A rear wall 18 (FIG. 3) having the same construction as front wall 14 depends from a rearward edge 20 of said flat top wall 12. A first downwardly inclined or beveled wall 19, of the same extent as front and rear walls 14, 18, is positioned at a first side edge of flat top wall 12. A second downwardly inclined or beveled wall 21, also of the same extent as front and read walls 14, 18, is positioned at an opposite, second side edge of flat top wall 12.

A layer of sound-absorbing material 24 is secured to undersurface 26 of flat top wall 12. Said layer of material covers said entire underface and has a predetermined thickness sufficient to appreciably attenuate the noise level generated by a marine generator. Material 24 is preferably a sound-absorbing foam.

Flat top wall 12 is maintained in parallel relation to a boat deck by a plurality of upstanding, equi-length leg members. The preferred embodiment of this invention includes two pairs of leg members and each pair shares its construction with its counterpart. As best understood in connection with FIGS. 1 and 4, a first pair of leg members includes front leg 30, rear leg 32, and interconnecting brace 34 that spans said leg members at their respective uppermost ends. The second pair of leg members, as best understood in connection with FIGS. 1 and 5, includes front leg 38, rear leg 40, and interconnecting brace 42 that spans leg members 38, 40 at their respective uppermost ends.

A first alignment aperture 44 (FIG. 4) is formed in rear wall 16 at a first preselected location and a second alignment aperture 46 (FIG. 5) is formed in rear wall 16 at a second preselected location that is laterally spaced apart from the first preselected location. When marine generator cover 10 is fully assembled, first alignment aperture 44 receives first alignment pin 48 (FIGS. 1 and 4) which is formed integrally with rear leg 32 of the first pair of leg members. Second alignment aperture 46 receives second alignment pin 50 (FIGS. 1 and 5) which is formed integrally with rear leg 40 of the second pair of leg members. Significantly, the sliding engagement between alignment apertures 44, 46 and their respective alignment pins is the only engagement between rear leg members 32, 40 and rear wall 16.

A front support gusset 52 (FIG. 2) interconnects front leg members 30, 38. Specifically, apertures 54, 56 are formed in front leg 30 in vertically spaced relation to one another and apertures 58, 60 are formed in front leg 38 in said relationship to one another. Matching apertures are formed in opposite ends of front gusset 52 and screws and nuts are used to join front gusset 52 to said legs. Thus, front gusset 52 acts as a brace that maintains legs 30, 38 in parallel relation to one another and hence in normal relation to a boat deck.

A rear support gusset 62 (FIG. 3) interconnects rear leg members 32, 40. Specifically, apertures 64, 66 are formed in rear leg 32 in vertically spaced relation to one another and apertures 68, 70 are formed in rear leg 40 in said relationship to one another. Matching apertures are formed in opposite ends of rear gusset 62 and screws and nuts are used to join rear gusset 62 to said legs. Rear gusset 62 acts as a brace that maintains rear legs 32, 40 in parallel relation to one another and hence in normal relation to a boat deck.

A first catch 72 (FIG. 2) of rigid construction is fixedly secured to front wall 14 in transversely spaced opposition to first alignment pin 48 and a second catch 74 of the same construction is fixedly secured to said front wall in transversely spaced apart opposition to second alignment pin 50. When first catch 72 is releasably engaged to first latch 76 and second catch 74 is releasably engaged to second latch 78, flat top wall 12 is securely latched into position by the combined action of said two latches and the engagement of alignment apertures 44, 46 and alignment pins 48, 50, respectively. Handle 76a of first latch 76 is rotated in a first direction to disengage said latch from first catch 72 and said handle is rotated in a second direction to rigidly engage said first latch to said first catch. Similarly, handle 78a of second latch 78 is rotated in a first direction to disengage said latch from second catch 74 and said handle is rotated in a second direction to rigidly engage said second latch to said second catch.

To service marine generator 80, first and second latches 76, 78 are released from their respective catches and flat top wall 12 is lifted by sliding alignment pins 48, 50 out of their respective alignment apertures 44. 46. The lifting of the front edge of the flat top wall will cause the alignment apertures to slide out of engagement with their respective alignment pins. After the generator has been serviced, it is a simple matter to realign the alignment pins with their respective alignment apertures and to reconnect the catch and latch members on the front side of the assembly.

However, the open-frame design of the novel noise attenuator enables many parts of the generator to be serviced with said attenuator locked into position.

The preferred material for the novel noise attenuator is stainless steel although other rigid materials impervious to the effects of fresh and salt water could also be used.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A sound-attenuating cover for a marine generator, comprising:
   a flat top wall adapted to overlie a marine generator in closely spaced apart relation thereto;
   a layer of sound-absorbing material secured to said flat top wall in underlying relation thereto;
      said flat top wall having a front edge, a rear edge, and opposed side edges;
   a front wall depending from said front edge, a rear wall depending from said rear edge, and a side wall depending from each of said side edges;
   a plurality of upstanding leg members for supporting said flat top wall;
      said plurality of upstanding leg members including a pair of rear leg members and a pair of front leg members;
   first releasable engagement means for releasably engaging said pair of rear leg members and said rear wall;
   second releasable engagement means for releasably engaging said pair of front leg members and said front wall;
      said second releasable engagement means including a lock means that locks said front wall to said pair of front leg members;
   said rear wall and said rear leg members being maintained in secure engagement to one another when said second releasable engagement means is in a locked configuration and being separable from one another when said second releasable engagement means is in said locked configuration;
   whereby when said second releasable engagement means is in said locked configuration said flat top wall is maintained in engaged relation to said upstanding leg members; and
   whereby when said second releasable engagement means is in its unlocked configuration said rear wall and said rear leg members are releasable from one another so that said flat top wall is disengageable from said upstanding leg members to facilitate access to said marine generator for service and repair purposes.

2. The cover of claim 1, further comprising:
   a pair of alignment apertures formed in said rear wall in spaced apart relation to one another;
   an alignment pin formed on each of said rear leg members;
   each alignment aperture of said pair of alignment apertures being adapted to slidingly receive an associated alignment pin when said rear wall is releasably engaged to said rear leg members.

3. The cover of claim 2, wherein said pair of rear leg members and said pair of front leg members includes a first pair of leg members formed by a first front leg member and a first rear leg member that are integrally formed with one another and a second pair of leg members formed by a second front leg member and a second rear leg member that are integrally formed with one another.

4. The cover of claim 3, further comprising:
   a pair of catch members secured to said front wall in spaced apart relation to one another;
   a corresponding pair of latch members, there being a first latch member secured to said first front leg member and a second latch member secured to said second front leg member;
   said first latch member including a first actuator handle and said second latch member including a second actuator handle;
      said first actuator handle having a first position that causes said first latch member to engage said first catch member and a second position that causes said first latch member to release said first catch member and said second actuator handle having a first position that causes said second latch member to engage said second catch member and a second position that causes said second latch member to release said second catch member;
   whereby said flat top wall is disengageable from said upstanding leg members when said first and second actuator handles are in their respective second positions;
   whereby said flat top wall is connected at four points to said upstanding leg members and is releasable from all four of said points by positioning said first and second actuator members in said respective second positions.

5. The cover of claim 4, further comprising a first interconnecting member that interconnects respective uppermost ends of said first front leg member and said first rear leg member and a second interconnecting member that interconnects respective uppermost ends of said second front leg member and said second rear leg member.

6. The cover of claim 5, further comprising a first brace member that interconnects said first front leg member and said second front leg member.

7. The cover of claim 6, further comprising a second brace member that interconnects said first rear leg member and said second rear leg member.

8. The cover of claim 1, wherein said front wall and said rear wall have a common trapezoidal configuration.

9. The cover of claim 8, wherein said opposing side walls have a common rectangular configuration.

10. The cover of claim 9, wherein said opposing side walls are sloped downwardly relative to a horizontal plane at an angle of about forty five degrees.

11. A water shield cover for a marine generator, comprising:
    a water resistant flat top wall adapted to overlie a marine generator in closely spaced apart relation thereto;
       said flat top wall having a front edge, a rear edge, and opposed side edges;
    a front wall depending from said front edge, a rear wall depending from said rear edge, and a side wall depending from each of said side edges;
    a plurality of upstanding leg members for supporting said flat top wall;
       said plurality of upstanding leg members including a pair of rear leg members and a pair of front leg members;
    first releasable engagement means for releasably engaging said pair of rear leg members and said rear wall;
    second releasable engagement means for releasably engaging said pair of front leg members and said front wall;
       said second releasable engagement means including a lock means that locks said front wall to said pair of front leg members;
    said rear wall and said rear leg members being maintained in secure engagement to one another when said second releasable engagement means is in a locked configuration and being separable from one another when said second releasable engagement means is in said locked configuration;

whereby when said second releasable engagement means is in said locked configuration said flat top wall is maintained in engaged relation to said upstanding leg members; and whereby when said second releasable engagement means is in its unlocked configuration said rear wall and said rear leg members are releasable from one another so that said flat top wall is disengageable from said upstanding leg members to facilitate access to said marine generator for service and repair purposes.

12. The cover of claim 11, further comprising:

a pair of alignment apertures formed in said rear wall in spaced apart relation to one another;

an alignment pin formed on each of said rear leg members;

each alignment aperture of said pair of alignment apertures being adapted to slidingly receive an associated alignment pin when said rear wall is releasably engaged to said rear leg members.

13. The cover of claim 12, wherein said pair of rear leg members and said pair of front leg members includes a first pair of leg members formed by a first front leg member and a first rear leg member that are integrally formed with one another and a second pair of leg members formed by a second front leg member and a second rear leg member that are integrally formed with one another.

14. The cover of claim 13, further comprising:

a pair of catch members secured to said front wall in spaced apart relation to one another;

a corresponding pair of latch members, there being a first latch member secured to said first front leg member and a second latch member secured to said second front leg member;

said first latch member including a first actuator handle and said second latch member including a second actuator handle;

said first actuator handle having a first position that causes said first latch member to engage said first catch member and a second position that causes said first latch member to release said first catch member and said second actuator handle having a first position that causes said second latch member to engage said second catch member and a second position that causes said second latch member to release said second catch member;

whereby said flat top wall is disengageable from said upstanding leg members when said first and second actuator handles are in their respective second positions;

whereby said flat top wall is connected at four points to said upstanding leg members and is releasable from all four of said points by positioning said first and second actuator members in said respective second positions.

15. The cover of claim 14, further comprising a first interconnecting member that interconnects respective uppermost ends of said first front leg member and said first rear leg member and a second interconnecting member that interconnects respective uppermost ends of said second front leg member and said second rear leg member.

16. The cover of claim 15, further comprising a first brace member that interconnects said first front leg member and said second front leg member.

17. The cover of claim 16, further comprising a second brace member that interconnects said first rear leg member and said second rear leg member.

18. The cover of claim 11, wherein said front wall and said rear wall have a common trapezoidal configuration.

19. The cover of claim 18, wherein said opposing side walls have a common rectangular configuration.

20. The cover of claim 19, wherein said opposing side walls are sloped downwardly relative to a horizontal plane at an angle of about forty five degrees.

* * * * *